United States Patent
Omiya et al.

(10) Patent No.: US 8,136,841 B2
(45) Date of Patent: Mar. 20, 2012

(54) SHOULDER POSITION ADJUSTER DEVICE

(75) Inventors: Masaki Omiya, Kanagawa (JP); Kiyoshi Ogawa, Kanagawa (JP); Atsushi Tsuha, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 357 days.

(21) Appl. No.: 12/522,632

(22) PCT Filed: Dec. 3, 2007

(86) PCT No.: PCT/JP2007/073340
§ 371 (c)(1),
(2), (4) Date: Jul. 9, 2009

(87) PCT Pub. No.: WO2008/084609
PCT Pub. Date: Jul. 17, 2008

(65) Prior Publication Data
US 2010/0018016 A1  Jan. 28, 2010

(30) Foreign Application Priority Data
Jan. 11, 2007 (JP) ............................. P. 2007-003658

(51) Int. Cl.
*B60R 22/20* (2006.01)
(52) U.S. Cl. .................................................. 280/801.2
(58) Field of Classification Search ............... 280/801.1, 280/801.2, 808; 297/482, 483
See application file for complete search history.

(56) References Cited

U.S. PATENT DOCUMENTS

| | | | | |
|---|---|---|---|---|
| 4,469,352 A * | 9/1984 | Korner et al. | .............. | 280/801.2 |
| 4,652,012 A * | 3/1987 | Biller et al. | ................ | 280/801.2 |
| 5,280,959 A * | 1/1994 | Nanbu | ........................... | 280/808 |
| 5,393,098 A * | 2/1995 | Thomas et al. | ............. | 280/801.2 |
| 5,655,793 A * | 8/1997 | Isonaga | ....................... | 280/801.2 |
| 5,725,248 A * | 3/1998 | Inoue et al. | ................. | 280/801.2 |
| 5,794,977 A * | 8/1998 | Frank | ........................... | 280/801.2 |
| 5,931,502 A * | 8/1999 | Frank et al. | ................. | 280/801.2 |
| 6,312,014 B1 * | 11/2001 | Ando et al. | ................. | 280/801.2 |
| 6,382,673 B1 * | 5/2002 | Ando | ........................... | 280/801.2 |
| 7,021,662 B2 * | 4/2006 | Hoffmann et al. | .......... | 280/801.2 |
| 7,404,579 B2 * | 7/2008 | Zierle et al. | .................... | 280/804 |
| 7,513,531 B2 * | 4/2009 | Gray | ........................... | 280/801.2 |
| 2007/0013185 A1 * | 1/2007 | Desmarais et al. | ......... | 280/801.2 |

FOREIGN PATENT DOCUMENTS

| | | |
|---|---|---|
| JP | 2001-39265 | 5/1990 |
| JP | 5-294208 | 11/1993 |
| JP | 2003-341469 | 12/2003 |
| JP | 2005-132229 | 5/2006 |

* cited by examiner

*Primary Examiner* — Paul N Dickson
*Assistant Examiner* — Robert A Coker
(74) *Attorney, Agent, or Firm* — Brinks Hofer Gilson & Lione (57) ABSTRACT

A button of a shoulder position adjuster device is provided including an outer surface portion which, at a normal state, is generally continuous with an outer surface of a cover facing an inner space of a passenger compartment. Flexible left and right outer lateral walls are formed continuously with the outer surface portion and have lock portions which are locked on to a side member at the normal state and which are released from the locked state at the time of a pulling operation. Additionally, a pair of connecting walls are provided which extend from the outer surface portion towards a guide rail side in the left and right outer lateral walls and connect the latch pin.

2 Claims, 8 Drawing Sheets

SHOULDER POSITION ADJUSTER DEVICE

CROSS REFERENCE TO RELATED APPLICATION

This application claims priority to International Application No. PCT/JP2007/073340, filed Dec. 3, 2007, which is based on and claims priority to Japanese Patent Application No. 2007-003658, filed Jan. 11, 2007.

FIELD OF THE INVENTION

The present invention relates to a shoulder position adjuster device and more particularly to a shoulder position adjuster device which is mounted in a vehicle for adjusting height of a through anchor that is used for a seat belt system for securing safety of an occupant.

BACKGROUND OF THE INVENTION

A shoulder position adjuster device is attached to a body frame such as a center pillar or the like, and conventionally, there have been proposed various shoulder position adjuster devices. The shoulder position adjuster device includes a guide rail which is fixed to the body frame, a slide member which is slidably attached to the guide rail, and a through anchor which is connected to the slide member and supporting a webbing. Then, locking is released by pinching a button which operates the slide member so as to slide the through anchor to an appropriate height position. After the adjustment is completed, the button is caused to return to its original position by a spring member. A latch member such as a pin is provided on the slide member and is detachably inserted into a predetermined position in a plurality of latch holes formed on the guide rail, whereby the through anchor is fixed to the appropriate height together with the slide member.

In a shoulder position adjuster device described in Japanese Patent Publication No. JP-A-5-294208, a button is divided into left and right members, and the two members are individually biased by springs so as to return to their original positions.

In addition, in a shoulder position adjuster device described in Japanese Patent Publication No. JP-A-2003-341469, a button is divided into an exterior button and an interior button, and the interior button is fastened and fixed to a latch pin which is biased by a latch spring.

Further, in a shoulder position adjuster device described in Japanese Patent Publication No. JP-A-2005-132229, a button is attached to a garnish which makes up a slide member so as to oscillate freely. In adjusting the height of the slide member, by the button being pinched to be oscillated, a latch pin is pulled out of a latch hole, so as to allow the slide member to slide.

Incidentally, in the shoulder position adjuster devices described in Japanese Patent Publication Nos. JP-A-5-294208 and JP-A-2003-341469, since the button is divided into the two members, the number of components is increased, leading to increased costs. In addition, in the shoulder position adjuster device described in Japanese Patent Publication No. JP-A-2005-132229, the button enables an operation in which the latch pin is pulled out of the latch hole attached to the garnish so as to oscillate freely, and the latch pin is made to be pulled out of the latch hole with a small force by using a leverage mechanism. However, due to the button being attached to the garnish so as to oscillate freely by a hinge portion, the construction can be complex and the assemblage can be troublesome. In addition, since the button moves in a curved direction while the latch pin moves straightly, the movement of the latch pin may become unsmooth.

SUMMARY OF THE INVENTION

The invention has been made in view of the situations described above, and an object thereof is to provide a shoulder position adjuster device with simple construction and assemblage so as realize a reduction in cost while enabling a latch pin to move smoothly.

According to one embodiment of the invention, a shoulder position adjuster device is provided including:
 a guide rail having a plurality of latch holes having predetermined intervals in a longitudinal direction and adapted to be fixed to a body frame;
 a slide member slidably attached to the guide rail;
 a through anchor connected to the slide member and supporting a webbing;
 a latch member provided on the slide member so as to advance and retreat and adapted to restrain the slide member from sliding on the guide rail by being projected from the slide member;
 a latch spring which biases the latch member so as to insert the latch member into the latch hole;
 a button which enables a pulling operation for pulling the latch member out of the latch hole against a biasing force of the latch spring; and
 a cover having an open window portion through which the button is externally exposed to and attached to the slide member,
 wherein a height of the through anchor is adjusted by selecting the latch hole with which the latch member engages,
 wherein the button includes:
  an outer surface portion which, at normal state, is generally continuous with an outer surface of the cover which faces an interior space of a passenger compartment of a vehicle,
  flexible left and right outer lateral walls formed continuously from the outer surface portion and having a lock portion which is locked on to the slide member at the normal state and is released from the locked state when the pulling operation is performed, and
  a connecting wall which extends from the outer surface portion to a guide rail side in the left and right outer lateral walls so as to connect the latch member.

According to another embodiment of the invention, the slide member of the aforementioned shoulder position adjuster device includes a spring compartment which accommodates the latch spring, and the spring compartment includes:
 a spring supporting portion which supports the latch spring and which is adapted to abut with an upper end of the latch member at the time of the pulling operation of the button so as to restrict the button from moving to the interior space of the passenger compartment side; and
 a slit through which a locking piece of the latch member, which connects to the connecting walls of the button, is allowed to project movably.

According to yet another embodiment of the invention, the side member further includes a button biasing portion which biases the lock portion of the button outwards when the lock portion of the button is locked on to the slide member.

In addition, the shape of the latch member is preferably a pin shape.

According to the shoulder position adjuster device of the present invention, since the button can be made up of the single member, the construction and assemblage are made simple, and by reducing the number of components, a reduction in costs can be realized. In addition, since the direction in which the button is displaced and the direction in which the latch member moves can be made to coincide with each other, the movement of the latch member can be made smooth.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Hereinafter, an embodiment of a shoulder position adjuster device according to the invention will be described by reference to the drawings. Note that directions described in the following description are based on a direction in which the shoulder position adjuster device is attached to a vehicle body. A vertical direction of the shoulder position adjuster device means a vertical direction of the vehicle body. A direction towards a near side means a side of an interior space of a passenger compartment. A rear surface side means an opposite direction to the near side direction, that is, a side of the shoulder position adjuster device where the shoulder position adjuster device is attached to the vehicle body.

Figure 1:
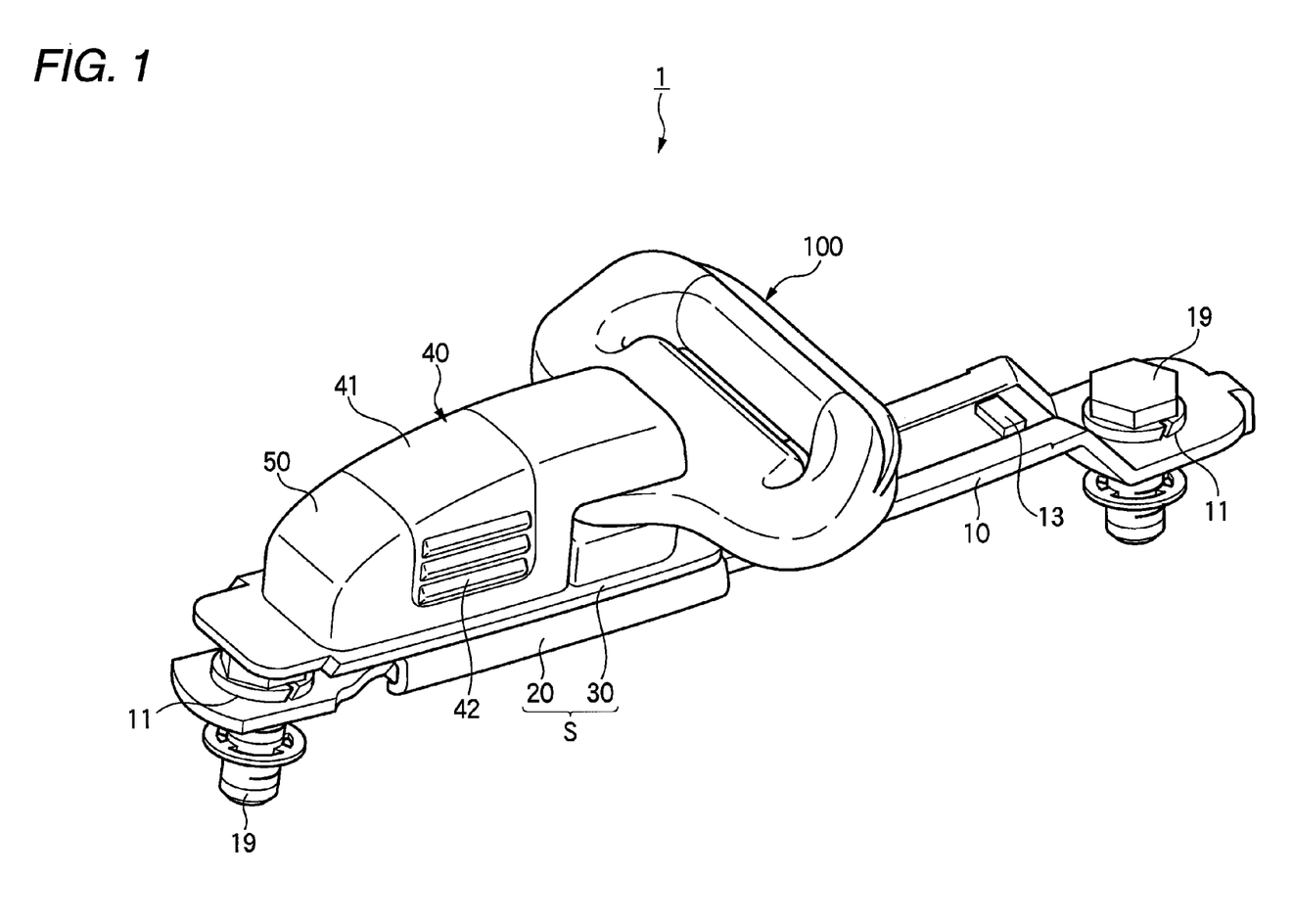
FIG. 1 is a perspective view showing an external appearance of a shoulder position adjuster device according to an embodiment of the invention.
Figure 2:
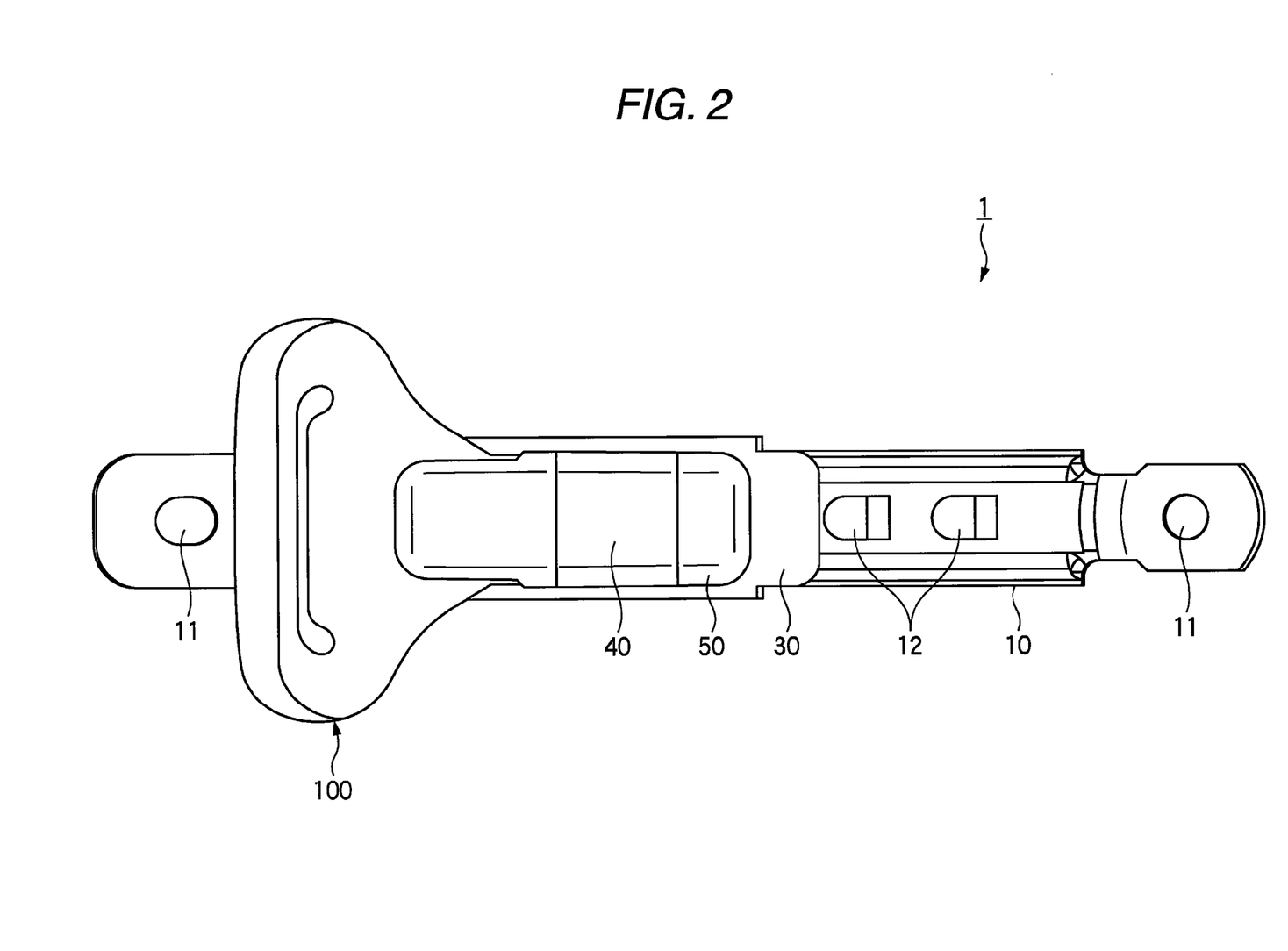
FIG. 2 is a front view of the shoulder position adjuster device of FIG. 1.
Figure 3:
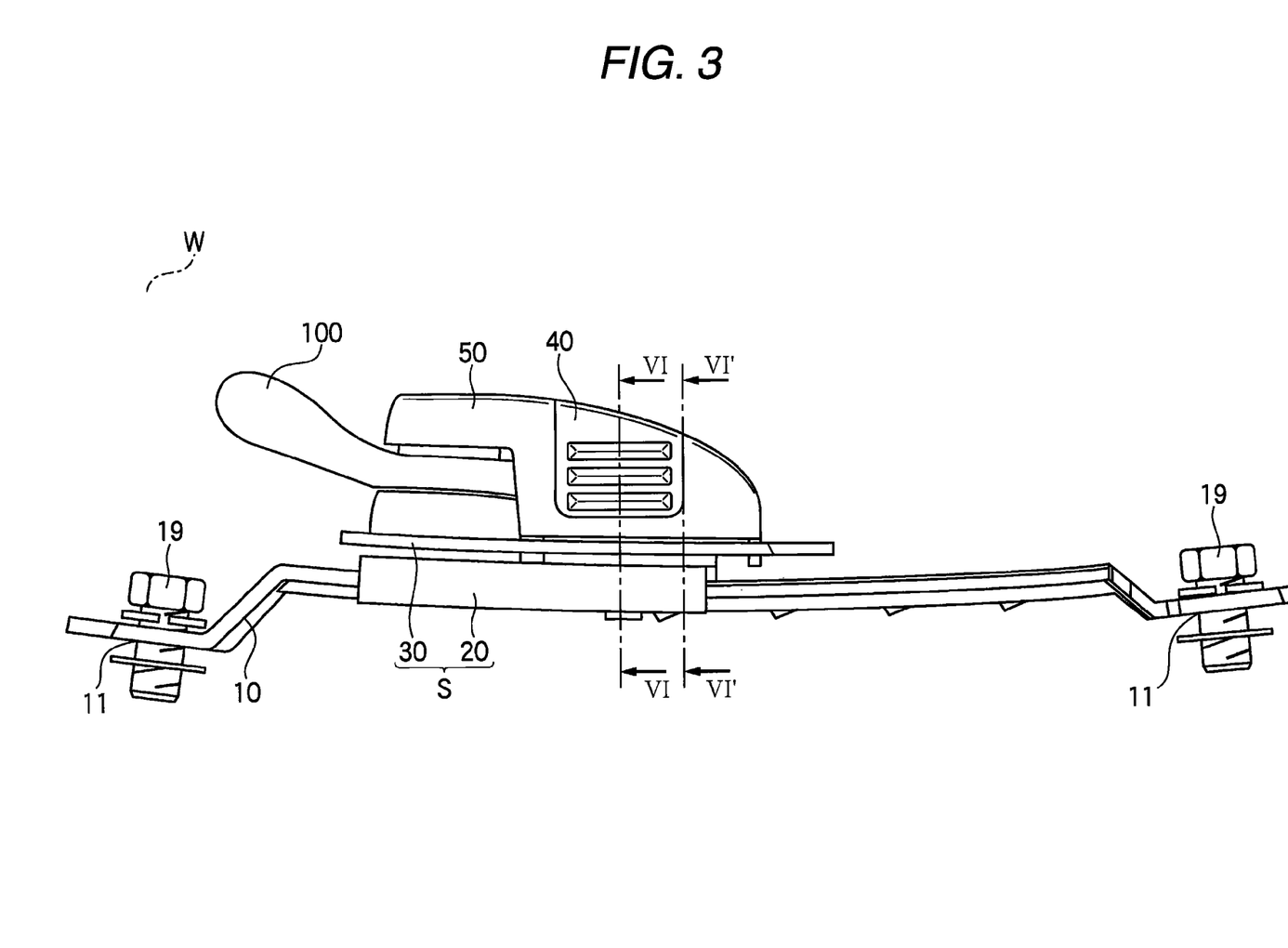
FIG. 3 is a side view of the shoulder position adjuster device of FIG. 1.

As is shown in FIGS. 1 to 3, a shoulder position adjuster device 1 according to one embodiment includes a guide rail 10, a slide member S, a through anchor 100, a latch pin 80, a latch spring 90, a button 40 and a cover 50.

The guide rail 10 is fixed integrally to a body frame such as a center pillar or the like with fixing devices such as bolts, and has a plurality of latch holes 12 formed at predetermined intervals in a longitudinal direction.

The slide member S engages with the guide rail 10 and is attached thereto so as to slide freely in vertical directions. The through anchor 100 is connected to the slide member S with a fixing device such as a bolt and movably supports a webbing W (refer to FIG. 3) at a longitudinal central portion thereof. The latch pin 80 is a latch member which is provided on the slide member S so as to advance and retreat. The latch pin 80 is adapted to restrain the slide member S from sliding on the guide rail 10 by being projected from the slide member S to engage with the latch hole 12. The latch spring 90 biases the latch pin 80 so as to insert the latch pin 80 into the latch hole 12. The button 40 enables a pulling operation of pulling the latch pin 80 out of a latch hole 12 against the biasing force of the latch spring 90. The cover 50 has an open window portion 54 through which the button 40 is externally exposed and is attached to the slide member S.

The guide rail 10 is made of metal such as, but not limited to, a high tensile strength steel which is treated with an electro-deposition process or plating. The guide rail 10 is curved moderately along a longitudinal direction (or a vertical direction) of the center pillar. An attaching hole 11 through which a bolt 19 (or the like) is inserted is opened in each end portion of the guide rail 10, so that the guide rail 10 is fixed to the body frame with bolts 19 inserted through these attaching holes 11. In addition, the plurality of latch holes 12 are formed in a transversely central portion of the guide rail 10. Further, a stopper 13 is provided in the vicinity of the attaching hole 11 on the lower end side of the guide rail 10 so as to make a lower limit for a downward movement of the slide member S.

Figure 4:
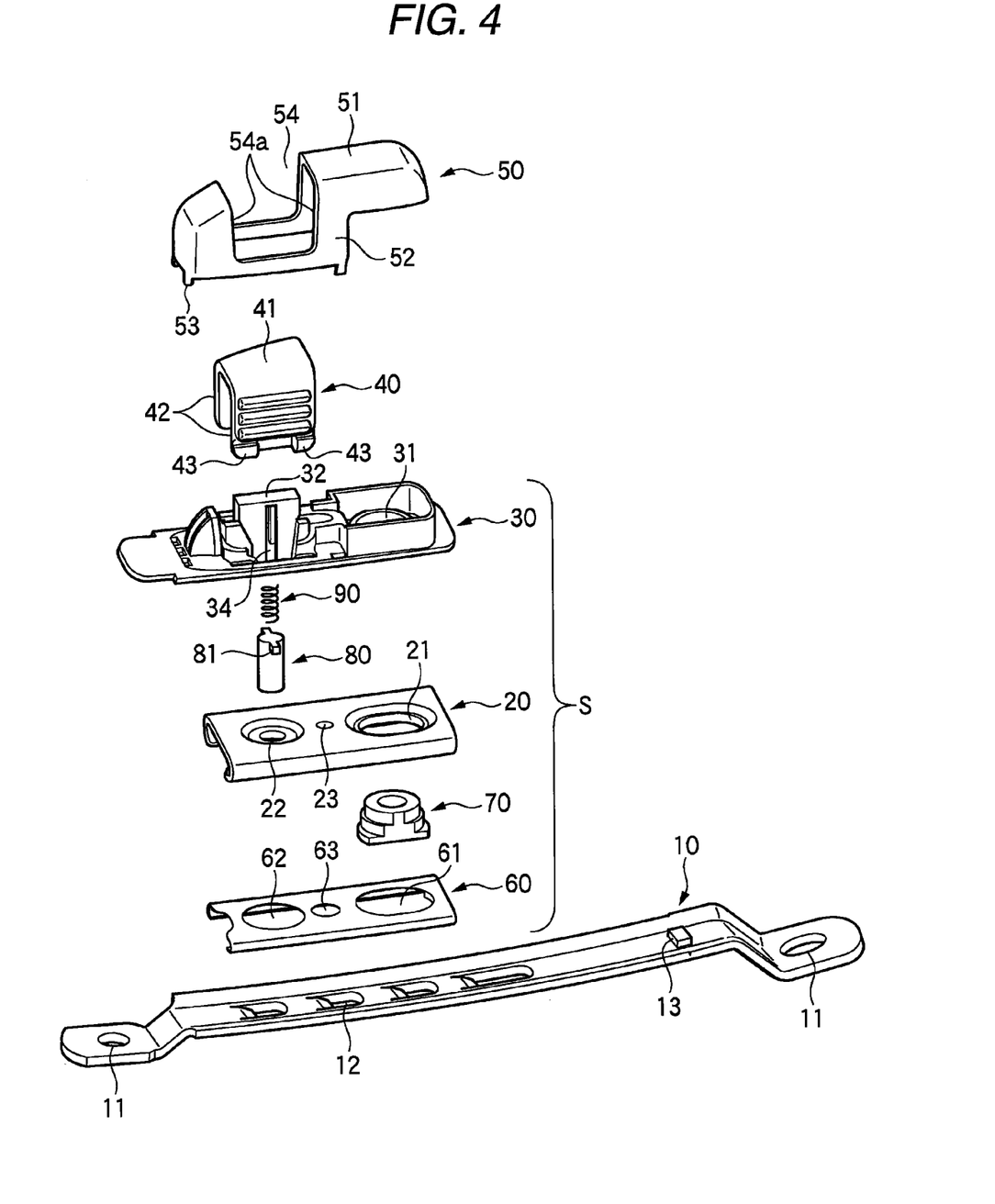
FIG. 4 is an exploded perspective view of the shoulder position adjuster device of FIG. 1.

As is shown in FIG. 4, the slide member S includes a slide base 20 which slidably engages with the guide rail 10, a garnish 30 which is fixed integrally to the slide base 20, and a slide piece 60 which is interposed between the guide rail 10 and the slide base 20 for increasing the slidability of the sliding base 20.

Figure 5:
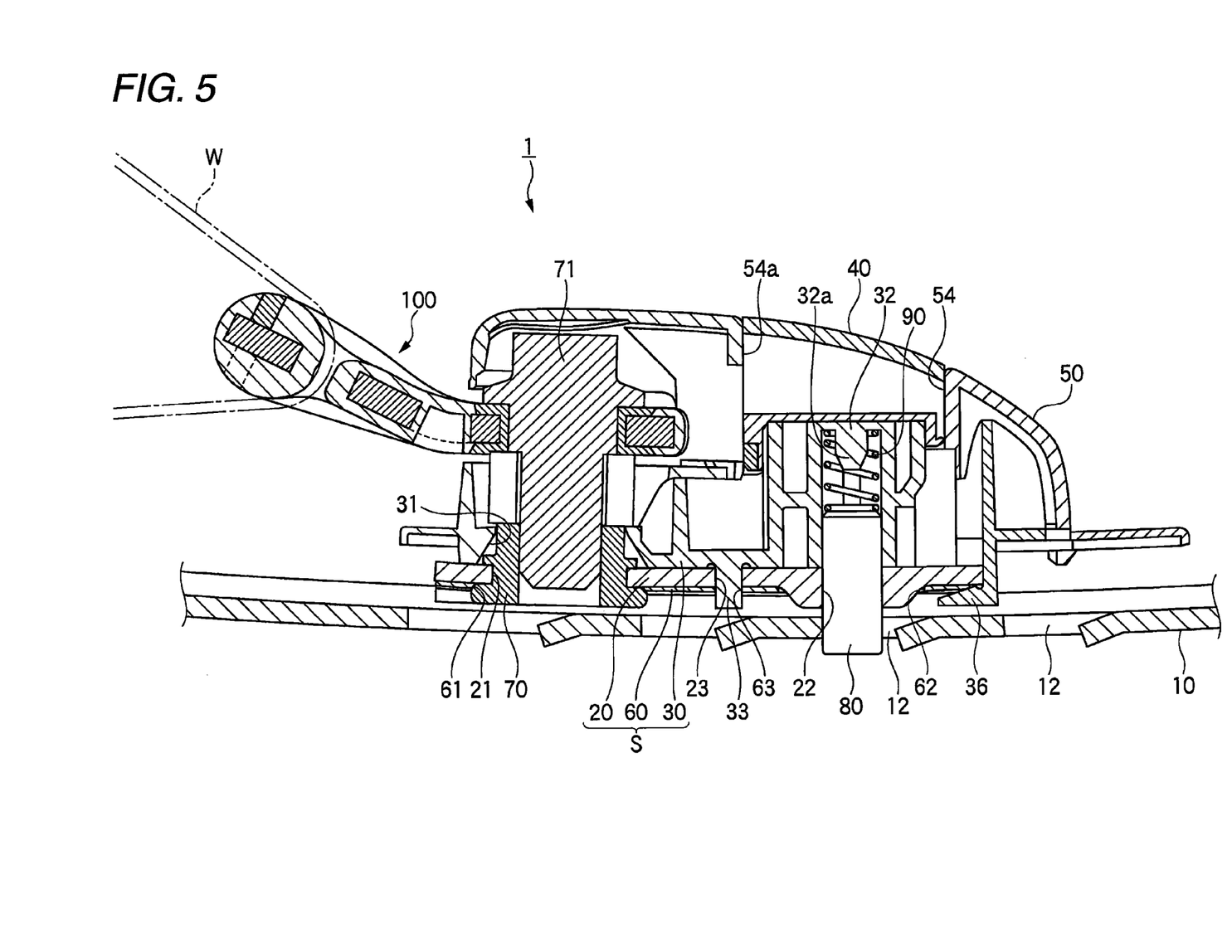
FIG. 5 is a side sectional view of the shoulder position adjuster device of FIG. 1.

The slide base 20 is made of metal such as, but not limited to, a high tensile strength steel whose surface is treated with an electro-deposition process or plating. The slide base 20 has a pin holding hole 22 having a position which is adapted to match with a position of one of the plurality of latch holes 12 on the guide rail 10 in accordance with the sliding position of the pin holding hole 22. The slide base 20 further includes a mounting hole 21 into which a nut 70 for fixing the through anchor 100 is mounted and a locking hole 23 though which a projection 33 (refer to FIG. 5) formed on a back side of the garnish 30 is inserted.

The slide piece 60 is made of resin such as polypropylene PP or the like. The slide piece 60 has a through hole 61 which corresponds to the nut 70, a holding hole 62 which surrounds a peripheral portion of the pin holding hole 22 in the slide base 20, and a locking hole 63 through which the projection 33 on the garnish 30 is inserted.

The garnish 30 is made of resin such as polypropylene PP or the like. The garnish 30 has a through hole 31 through which the nut 70 is penetrated, a spring compartment 32 accommodating the latch pin 80 and the latch spring 90 in a position corresponding to the pin holding hole 22 in the slide base 20, and the projection 33 formed on the back side of the garnish 30.

In addition, by fitting this projection 33 into the locking holes 23, 63 in the slide base 20 and the garnish 30, respectively, the garnish 30, the slide base 20 and the slide piece 60 are joined together so as to slide as one member.

Additionally, the nut 70 is fixed in place in the mounting hole 21 in the slide base 20, so that the nut 70 is placed within the through hole 31 in the garnish 30 joined integrally with the slide base 20. In addition, by fastening a bolt 71 which rotatably supports the through anchor 100 into the nut 70, the through anchor 100 is attached to the slide member S (refer to FIG. 5).

The latch pin 80 is made of metal such as S50C (or the like) which is heat treated and quenched. The latch pin 80 is slidably inserted into the pin holding hole 22 of the slide base 20, and the latch pin 80 is further inserted into and engages with the latch hole 12 of the guide rail 10, the position of which matches with the position of the latch pin 80, and consequently, the slide member S is fixed to the guide rail 10.

An upper portion of the latch pin 80 is accommodated in the spring compartment 32 of the garnish 30. The latch spring 90 for biasing the latch pin 80 towards the guide rail 10 is interposed between the upper end of the latch pin 80 and a ceiling wall of the spring compartment 32. This latch spring 90 is supported by a spring supporting portion 32a which is formed on the ceiling wall of the spring compartment 32, so as to bias the latch pin 80 in a direction in which the latch pin 80 is inserted into the latch hole 12 on the guide rail 10.

In addition, a pair of locking pieces 81 is provided on an outer circumferential portion of the upper end of the latch pin 80 so as to project radially outwards. This pair of locking pieces 81 projects movably through slits 34 formed in side walls of the spring compartment 32, so as to be connected to the button 40 positioned outside thereof.

The button 40 is made of resin such as polypropylene PP, polyacetal POM, or the like. The button 40 is made to be connected to the upper end of the latch pin 80 so as to be enabled to perform a pulling operation of the latch pin 80. That is, the button 40 is operable to pull the latch pin 80 out of the latch hole 12 against the biasing force of the latch spring 90 when adjusting the height of the slide member S. The button 40 has an outer surface portion 41 and left and right outer lateral walls 42, and is formed into an inverted U-shape in cross section. The button 40 has a pair of connecting walls 45 which extends from the outer surface portion 41 towards the guide rail 10 at an interval inside the left and right lateral walls 42 individually. Thus, the locking pieces 81 at the upper end of the latch pin 80 engage with locking holes 46 provided in the connecting walls 45, and the button 40 and the latch pin 80 are connected directly to each other.

The left and right outer lateral walls 42 of the button 40 have lock projections (lock portions) 43 which, at the normal state, engage with lock grooves 35 on the garnish 30. The left and right outer lateral walls 42 are flexible such that when the left and right outer lateral walls 42 are pinched by fingers so as to adjust the height of the slide member S, the left and right walls 42 are deflected inwards to release locking of the lock projections 43 relative to the lock grooves 35. In such a state that the locking of the lock projections 43 is released, the button 40 is allowed to be displaced in a direction in which the latch pin 80 can be pulled out of the latch hole 12. Thus, by operating the button 40 so as to be displaced, the latch pin 80 is allowed to be pulled out of and inserted into the latch hole 12.

In addition, the lock projections 43 are formed on both vertical sides of the button 40 so as to straddle the locking hole 46 in the connecting wall 45, and an intermediate portion between the projections so formed is made thin so that the left and right outer lateral walls 42 are prevented from interfering with the connecting walls 45 and the locking pieces 81 of the latch pin 80 when they are deflected inwards. Thus, space in the width direction is saved.

The cover 50 is made of resin such as polypropylene (or the like) and is attached to the garnish 30 of the slide member S so as to cover the slide member S. The cover 50 has an upper wall 51 and left and right lateral walls 52 and is formed into an inverted U-shape in cross section. Further, the cover 50 has claws 53 at lower ends of both the lateral walls 52 so as to engage with the garnish 30. In addition, the open window portion 54 into which the button 40 is fitted is formed by partially cutting the upper wall 51 and the left and right lateral walls 52.

By fitting the button 40 into this open window portion 54, the outer surface of the cover 50 and the outer surface of the button 40 are made to form a continuous surface. As this occurs, vertical edge portions 54a of the open window portion 54 function to guide the movement of the button 40 when the button 40 is operated to be displaced.

When assembling the shoulder position adjuster device 1, firstly, the nut 70 is mounted on the slide base 20 so as to be integrated therewith, and the slide piece 60 is disposed on a lower surface of the slide base 20. Then, the upper portion of the latch pin 80 and the latch spring 90 are accommodated within the spring compartment 23 while projecting the locking pieces 81 of the latch pin 80 from the slits 34 formed in the spring compartment 32 of the garnish 30. Additionally, the latch pin 80 is inserted into the pin holding hole 22 in the slide base 20, and the garnish 30 is disposed on an upper surface of the slide base 20. In this state, a claw portion 36, which is provided at a distal end of the back side of the garnish 30, engages with the slide base 20, and the projection 33 on the garnish 30 is fitted in the respective locking holes 23, 63 of the slide base 20 and the slide piece 60. Further, the bolt 71 which rotatably supports the through anchor 100 is fastened into the nut 70 which is exposed from the through hole 31 in the garnish 30, and the slide base 20 and the garnish 30 are joined together strongly and rigidly.

Next, the locking holes 46 in the connecting walls 45 of the button 40 engage with the locking pieces 81 of the latch pin 80 which project from the slits 34 in the lateral walls of the spring compartment 32 of the garnish 30, and the lock projections 43 on the left and right lateral side walls 42 engage with the lock grooves 35 on the garnish 30, so that the button 40 is attached to the garnish 30. Further, the cover 50 is mounted on the garnish 30 via the claws 53.

In this state, the slide base 20 slidably engages with the guide rail 10, and the button 40 is released in an appropriate sliding position, so that the latch pin 80 is inserted into the latch hole 12 on the guide rail 10, and the slide member S is fixed to the guide rail 10.

Figure 6A:
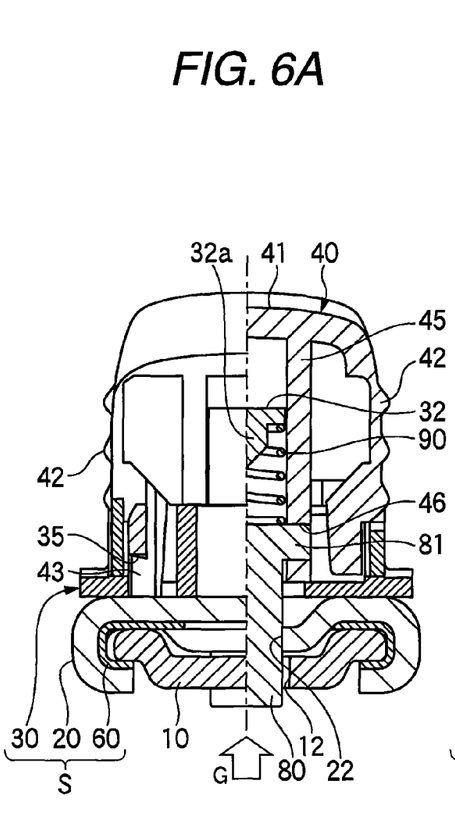
FIG. 6A shows a right-hand and a left-hand sectional view taken along the lines VI-VI and VI'-VI' in FIG. 3, respectively, wherein the shoulder position adjuster device is in a latched state.

In this way, in a fixed state as shown in FIG. 6A, even in the event that a load G is exerted in a direction in which the latch pin 80 is pulled out, since the lock projections 43 of the button 40 are in engagement with the lock portions 35 of the garnish 30, releasing of the button 40 from the locked state is prevented.

Figure 6B:
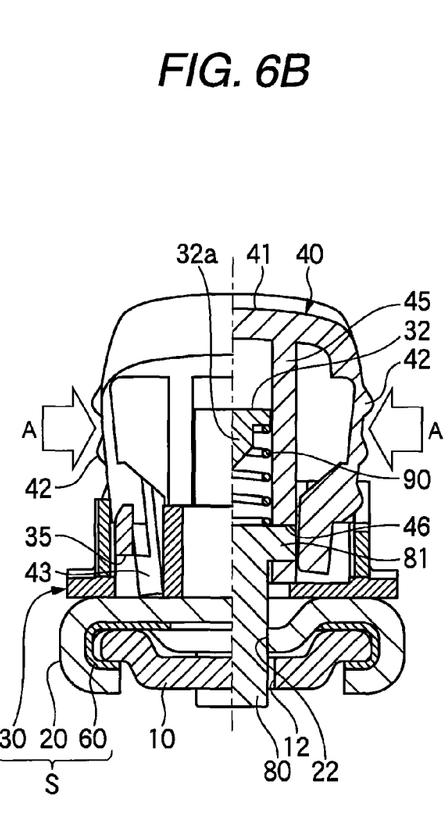
FIG. 6B shows a right-hand and a left-hand sectional view taken along the lines VI-VI and VI'-VI' in FIG. 3, respectively, wherein the shoulder position adjuster device is in a state in which a button is pinched to unlock the button which is locked on to a garnish in order to disengage a latch.
Figure 6C:
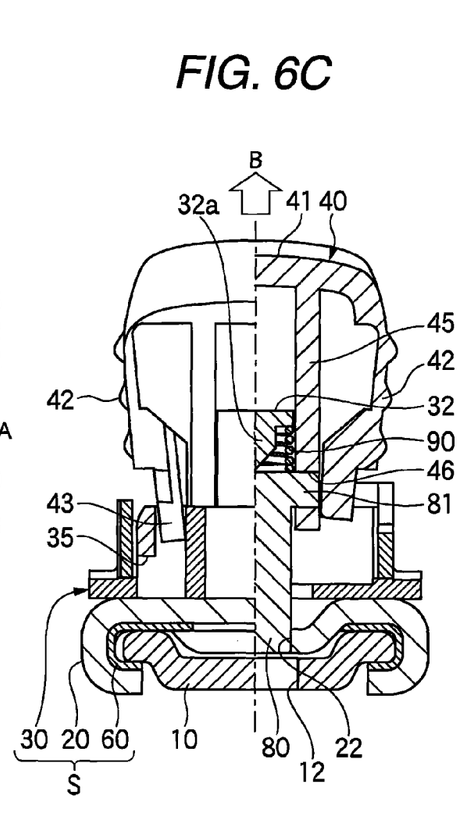
FIG. 6C shows a right-hand and a left-hand sectional view taken along the lines VI-VI and VI'-VI' in FIG. 3, respectively, wherein the shoulder position adjuster device is in a state in which the button is pulled up to disengage the latch.

In addition, when adjusting the height of the slide member S from the fixed state shown in FIG. 6A, the operator pinches the left and right outer lateral walls 42 of the button 40 and exerts a pinching force thereto so as to push the lateral walls inwards (as shown by arrows A in FIG. 6B). Thus, the locking between the lock projections (lock portions) 43 of the button 40 and the lock grooves 35 of the garnish 30 is disengaged. In this state, the button 40 is operated to be pulled out towards a near side as is shown by arrow B in FIG. 6C. Through the series of operations performed in the way described above, the latch pin 80 connected to the button 40 can be pulled out of the latch hole 12, and in this state, the slide member S can be caused to slide along the guide rail 10. In addition, the movement of the button 40 towards the near side is restricted by abutting the upper end of the latch pin 80 with the spring supporting portion 32a on the spring compartment 32. Next, after the side member S is adjusted to the desired height, the button 40 is released. Then, the latch pin 80 is inserted into the latch hole 12 on the guide rail 10 by virtue of the elastic force of the latch spring 90, whereby the slide member S is fixed to the guide rail 10.

Consequently, according to the shoulder position adjuster device 1 of an exemplary embodiment, the button 40 includes:

the outer surface portion 41 which, at the normal state, is generally or substantially continuous with the outer surface of the cover 50 which is a side which faces the inner space of the passenger compartment;

the flexible left and right outer lateral walls 42 which are formed continuously with the outer surface portion 41, wherein the left and right outer lateral walls 42 have the lock projections 43 which are locked on to the slide member S at the normal state, and, are released from the locked state when the button 40 is operated to pull the latch pin 80 out of the latch hole 12; and the pair of connecting walls 45 which extend from the outer surface portion 41 towards the guide rail 10 inside the left and right outer lateral walls 42 so as to connect the latch pin 80.

The button 40 can be made up of the single member, whereby the construction and assemblage are made simple, and the number of components can be reduced so as to realize a reduction in cost. In addition, the direction in which the button 40 is displaced and the direction in which the latch pin 80 moves can be made to coincide with each other, whereby the movement of the latch pin 80 can be made to be smooth.

In addition, the slide member S includes the spring compartment 32 which accommodates the latch spring 90, and the spring compartment 32 has: the spring supporting portion 32a which supports the latch spring 90 and restricts the movement of the button 40 towards the inner space of the passenger compartment by abutting with the upper end of the latch pin 80 when the button 40 is operated to pull out the latch pin 80 from the latch hole 12; and the slits 34 through which the locking pieces 81 of the latch pin 80 connecting to the connecting walls 45 of the button 40 are caused to project movably. Accordingly, the button 40 can be made up of a single member without providing separate members for holding the button 40 and the latch pin 80, thereby making it possible to realize a reduction in cost.

Note that the invention is not limited to the embodiment described heretofore but can be improved or modified as required.

Although the shape of the latch member of the invention is arbitrary and can be of any suitable shape, the pin shape adopted for the latch pin 80 of the embodiment is preferred.

In addition, although the connecting walls 45 are preferably formed into the pair of connecting walls adopted in this embodiment, any suitable configuration can be adopted, and preferably, the connecting walls 45 are provided with elected walls which connect the latch member.

Figure 8:
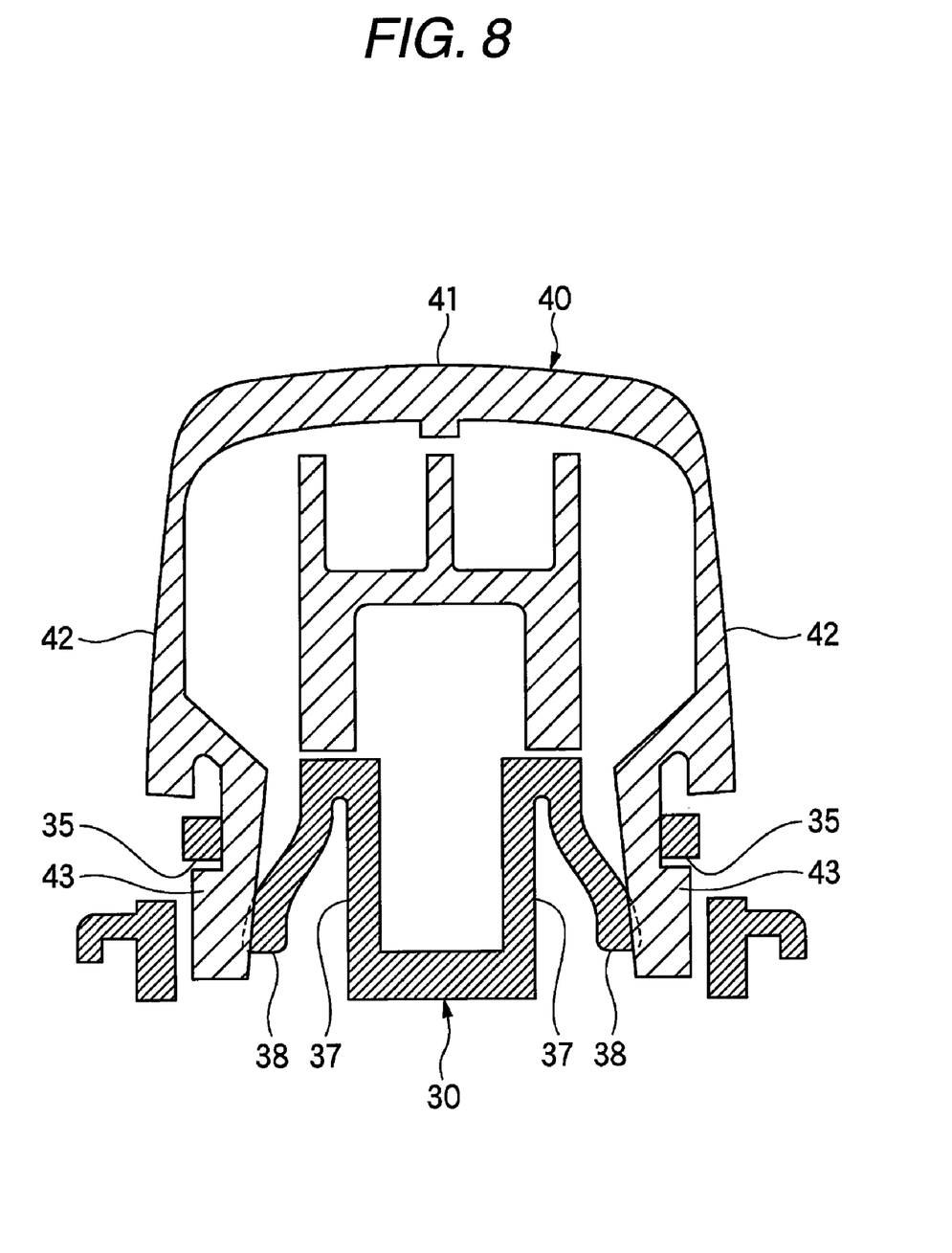
FIG. 8 is a cross sectional view of main parts of a button and a garnish of a shoulder position adjuster device according to an alternative embodiment.

Further, as is illustrated in an alternative embodiment shown in FIG. 8, a garnish 30 may have a pair of erected walls 37, and a pair of button biasing portions 38. The pair of erected walls 37 are provided individually on both longitudinal sides of the garnish 30 relative to a spring compartment 32 transversely inside of lock pieces which configure a pair of lock grooves 35. The pair of button biasing portions 38 are individually bent outwards in a width direction from the pair of erected walls 37 so as to be formed integrally therewith. These button biasing portions 38 are expanded widely in the width direction so as to be deformed elastically. Outer surfaces in the width direction of these button biasing portions 38 are formed wider than an interior width between lock portions 43 of the button 40 at normal times. The button biasing portions 38 which are formed in the way described above outwardly bias inner surfaces of the lock portions 43 of left and right outer lateral walls 42 of the button 40 which are deflected inwards by a pinching force exerted thereon when the lock portions 43 of the button 40 engage with the lock grooves 35 of the garnish 30. In addition, the button biasing portions 38 assist the lock portions 43 to expand in the width direction for restoration after the lock portions 43 have been engaged with the lock grooves 35.

Figure 7:
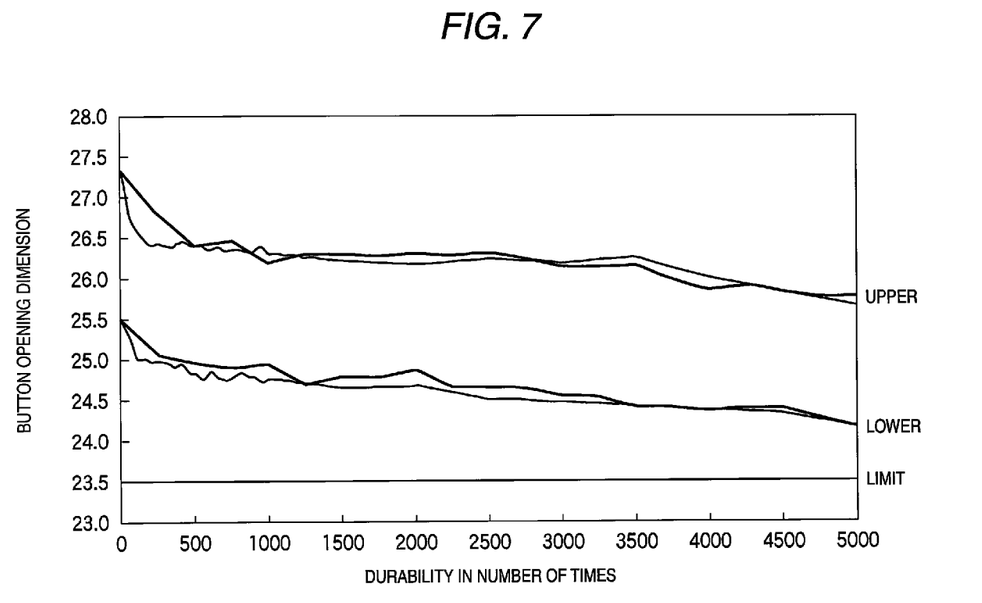
FIG. 7 is a graph showing the durability of the button according to the number of pinching times.

By way of example, FIG. 7 illustrates graphical waveforms of the results of a durability test in terms of the number of times a pinching of the button 40 was carried out by using the shoulder position adjuster device of the present invention. Here, a distance between the outer surfaces of the set of lock projections 43 arranged in the width direction of the button 40 was referred to as a button opening dimension, and there were two types of buttons prepared whose initial opening dimensions were about 27.3 mm and about 25.5 mm. In addition, a limit value at which the locking of the button 40 was released due to an impact load G exerted in the pulling-out direction and which was determined by the set of lock grooves 35 of the garnish 30 which are arranged in the width direction was set to 23.5 mm.

As is shown in FIG. 7, the opening dimensions of the button 40 upon repeated elastic deformations was on the order of 1 mm until 500 times, and thereafter, the amount of deformation of the button 40 was increased gradually. However, even when the number of times of pinching the button 40 exceeded 5000 times, the opening dimensions of the button 40 never lowered below the limit value. Accordingly, it can be seen that sufficient durability is obtained with the shoulder position adjuster device of the present invention.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

What is claimed is:

1. A shoulder position adjuster device comprising:
   a guide rail having a plurality of latch holes arranged at predetermined intervals in a longitudinal direction, the guide rail being adapted to be fixed to a body frame;
   a slide member slidably attached to the guide rail;
   a through anchor connected to the slide member and supporting a webbing;
   a latch member provided on the slide member so as to advance and retract, the latch member being adapted to restrain the slide member from sliding on the guide rail by being projected from the slide member;
   a latch spring which biases the latch member so as to insert the latch member into a latch hole of the plurality of latch holes;
   a button which enables a pulling operation of the latch member, the pulling operation including pulling the latch member out of the latch hole against a biasing force of the latch spring; and
   a cover attached to the slide member and having an open window portion through which the button is externally exposed,
   wherein a height of the through anchor is adjusted by selecting the latch hole with which the latch member is inserted into, wherein the button comprises:
an outer surface portion which, at a normal state, is continuous with an outer surface of the cover which faces an interior space of a vehicle,
flexible left and right outer lateral walls formed continuously from the outer surface portion and having a lock portion which is locked on to the slide member at the normal state and is released from the locked state when the pulling operation is performed, and
a connecting wall which extends from the outer surface portion towards the guide rail in the left and right outer lateral walls so as to connect the latch member;
wherein the slide member comprises a spring compartment for accommodating the latch spring, the spring compartment comprising:
a spring supporting portion for supporting the latch spring, adapted to abut with an upper end of the latch member during the pulling operation so as to restrict the button from moving to the interior space of the vehicle,
a wall surrounding a portion of the latch spring, and
a pair of slits in opposite portions of the wall, and
wherein the latch member comprises a locking piece configured to project movably through the pair of slits, the locking piece being connectable to the connecting walls of the button.

2. The shoulder position adjuster device of claim 1, wherein the slide member further comprises a button biasing portion for biasing the lock portion of the button outwards when the lock portion of the button is locked on to the slide member.

* * * * *